United States Patent [19]

Hallberg

[11] Patent Number: 5,125,271

[45] Date of Patent: Jun. 30, 1992

[54] METHOD AND APPARATUS FOR BALANCING A ROTOR

[75] Inventor: David R. Hallberg, Moneta, Va.

[73] Assignee: Gebr. Hofmann GmbH & Co., KG, Pfungstadt, Fed. Rep. of Germany

[21] Appl. No.: 684,511

[22] Filed: Apr. 15, 1991

Related U.S. Application Data

[63] Continuation of Ser. No. 404,223, Sep. 8, 1989, abandoned.

[51] Int. Cl.⁵ .............................................. G01M 1/38
[52] U.S. Cl. ...................................... 73/462; 409/133
[58] Field of Search ...................... 73/462, 464, 468; 408/2; 409/133

[56] References Cited

U.S. PATENT DOCUMENTS

| | | | |
|---|---|---|---|
| 3,854,339 | 12/1974 | Muller | 73/464 |
| 4,442,712 | 4/1984 | Junck et al. | 73/462 |
| 4,467,649 | 8/1984 | Mueller | 73/464 |
| 4,475,393 | 10/1984 | Reutlinger | 73/464 |
| 4,626,147 | 12/1986 | Nystuen et al. | 73/468 |

Primary Examiner—John E. Chapman
Attorney, Agent, or Firm—Cushman, Darby & Cushman

[57] ABSTRACT

A method and an apparatus for balancing a rotor, in which compensation points are distributed symmetrically on the rotor's circumference about the axis of the rotation, which compensation points are suitable for an imbalance compensation by means of a component revolving with the rotor and on its circumference having scannable structural elements, pulses are generated that provide information for the respective rotational angle position of the rotor for determining the imbalance angular position and for indexing the rotor after the imbalance measuring run into the compensation angle position, and this component may be embodied as a gear wheel or fan wheel.

17 Claims, 2 Drawing Sheets

METHOD AND APPARATUS FOR BALANCING A ROTOR

This is a continuation application Ser. No. 07/404,223, filed on Sep. 8, 1989, which was abandoned upon the filing hereof.

BACKGROUND OF THE INVENTION

1. Field of the Invention

The invention relates to a method and apparatus for balancing a rotor, which has compensation points distributed symmetrically on its circumference about the axis of the rotation, which compensation points are suitable for an imbalance compensation.

It is known to use a perforated or slotted disk for the element revolving with the rotor, with the disk revolving angularly accurately with the rotor, and to scan the holes or slits and in so doing generate the pulses that indicate the rotational angularity of the rotor at that time. It is also known to provide a marking on the rotor, scan this marking, and thereby obtain a phase reference for the rotational angularity of the rotor at that time.

SUMMARY OF THE INVENTION

From U.S. Pat. No. 3,854,339, it is known to obtain information on the rotational angularity of the rotor at a given time without such aids, in rotors that have compensation points distributed symmetrically over their circumference, at which points an imbalance compensation can be performed. To this end, the poles or the slits between the poles are scanned and counted, and from this a phase reference and the respective information as to the rotational angularity of the rotor are derived. This method can be used in particular for balancing electric motor armatures.

In rotors that do not have this kind of symmetrical construction, it has therefore been impossible until now to obtain the required information on the rotational angle of the rotor at that time during the imbalance measuring run and during the indexing process, in the measuring station and/or in the indexing station in which the rotor is turned to the appropriate compensating angular position for the imbalance compensation, without using additional markings on the rotor or without using angle encoders, for instance in the form of the aforementioned perforated disk, that revolve with the rotor. In electric motor armatures as well, in which the spacings between the poles are relatively small, it is no longer possible, at a rotational speed necessary for the imbalance measurement, to recognize and scan the poles or these narrow slits. The structurally dictated symmetrical embodiment of the rotor for obtaining the rotational angle information can no longer be exploited. In this respect, the rotor behaves like a smooth cylindrical rotor, without poles or slits.

It is therefore the object of the invention to obtain information on the rotational angle of the rotor, both for the imbalance measuring run and for the positioning of the rotor that is to be balanced for the imbalance compensation, both during the imbalance measuring run and in the imbalance compensation, without additional effort in the measuring or compensation station and without additional marking of the rotor.

This object is attained by the present invention in that a component which has scannable structural elements symmetrically arranged in the circumferential direction about its axis of rotation is connected for rotation with the rotor before the imbalance measuring run is performed. Particularly for later use of the rotor in its intended operation, this component and the rotor to be balanced remain rotationally connected, and during the imbalance measuring run, the component that rotates simultaneously with the rotor is scanned for the generation of the pulses which refer to the particular rotational angle of the rotor. Furthermore, in positioning the rotor in the compensating angular position for a reference angularity or for a phase reference, one of the structural elements disposed symmetrically in the circumferential direction about the axis of rotation of the component that rotates jointly with the rotor is used.

As a result, a component that is rotationally connected to the rotor for its later intended use, such as a gear wheel or fan wheel or the like, is used for generating the phase reference both in the imbalance measurement and in the position for the imbalance compensation. This means that the required rotational angle information relating to the rotor is obtained both in the imbalance measuring run and in the compensation process, in particular in indexing the rotor into the compensation angle position, without additional effort in terms of measuring apparatus and the compensating apparatus and without additional marking of the rotor.

In terms of apparatus, the stated object is attained in that to generate the pulses that provide the information on the rotational angularity of the rotor, a component having scannable structural elements disposed symmetrically in the circumferential direction about its axis of rotation is brought into rotational connection with the rotor to be balanced, and these structural elements are scanned by a scanner that operates the pulses. The scanner is also connected to a counter, which is adjusted to the number of structural elements on the component that jointly rotates with the rotor that are scanned per rotation. For the imbalance angle measurement and for the indexing process, one of these structural elements forms the phase reference.

The invention can be used in arbitrarily embodied rotors, such as smooth cylindrical rotors as well as motor armatures, for example, in which the poles are separated from one another by slits which are so narrow that they cannot be recognized for providing angularity information at the rotational speed necessary for the imbalance measurement.

In such rotors having imbalance compensation points distributed symmetrically about their axis of rotation, the rotor is also arrested at a particular angularity after the imbalance measuring run and then is rotated by a differential angle until a point suitable for the imbalance compensation is scanned on the rotor with the aid of a second scanner. The rotation takes place relatively slowly, so that the slit between the imbalance compensation points on the rotor, or the first imbalance compensation point on the rotor to appear after this rotation, is detected. Further, the differential angle between the reference angularity, which is determined by one of the structural elements disposed symmetrically in the circumferential direction about the axis of rotation of the jointly rotating component, and the angularity which the rotor assumes upon scanning of the point suitable for the imbalance compensation, is determined. For the final indexing of the rotor into the compensation angle position, this differential angle is then added to the measured imbalance angle and used to control the indexing device.

Preferably, the jointly rotating component is a component disposed coaxially with the rotor to be balanced and connected in a manner fixed against relative rotation to the rotor; as already explained this component may be a gear wheel. This component is then mounted on the rotor shaft in a manner fixed against relative rotation and remains in this rotational connection for the later use of the balanced rotor.

In both the imbalance measurement and the imbalance compensation process performed after it, imbalance in the unit comprising the jointly rotating component and the rotor is ascertained and compensated for.

With the present invention, it is possible to perform both the imbalance measuring run and the imbalance compensation in the same station. The rotor need not be removed from the mount after the performance of the imbalance measuring run in order to perform the imbalance compensation. To perform the imbalance compensation, the compensation tools are brought to the rotor, which has been indexed into the compensation angle position in the station.

However, the invention can also be used for balancing equipment such as the kind in which both a measuring station and a compensation station are provided, and also in which there is a transfer station between these two stations that, after the measuring run, transfers the rotor to be balanced from the measuring station to the compensation station. As a result, a shorter cycling time is attained.

BRIEF DESCRIPTION OF THE DRAWINGS

The invention will be described in further detail in terms of an exemplary embodiment, referring to the accompanying drawings. Shown are.

DETAILED DESCRIPTION OF THE PREFERRED EMBODIMENTS

Figure 1:
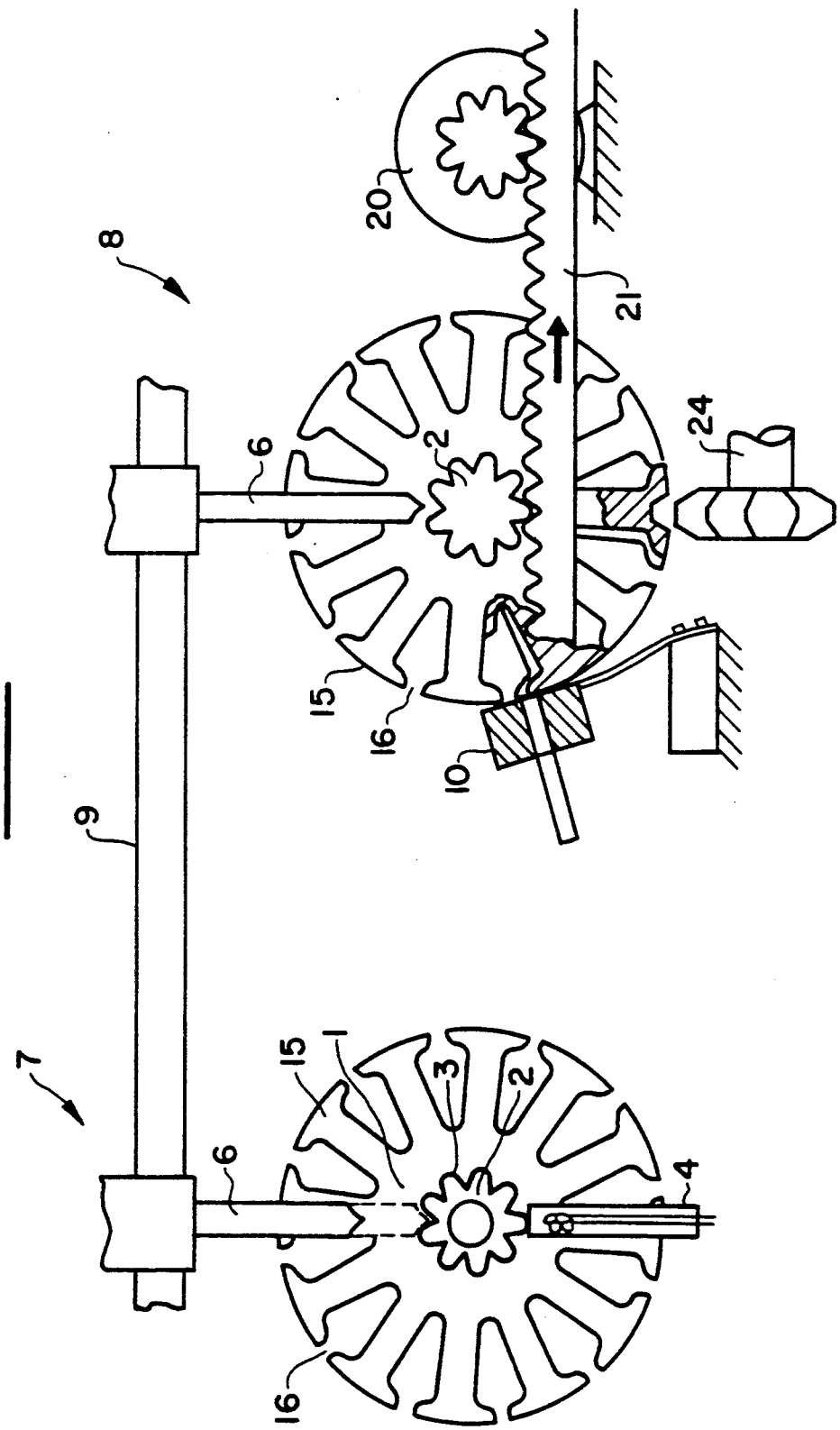
FIG. 1, schematically, the disposition in a measuring station and in an imbalance compensation station of a rotor that is to be balanced.
Figure 2:
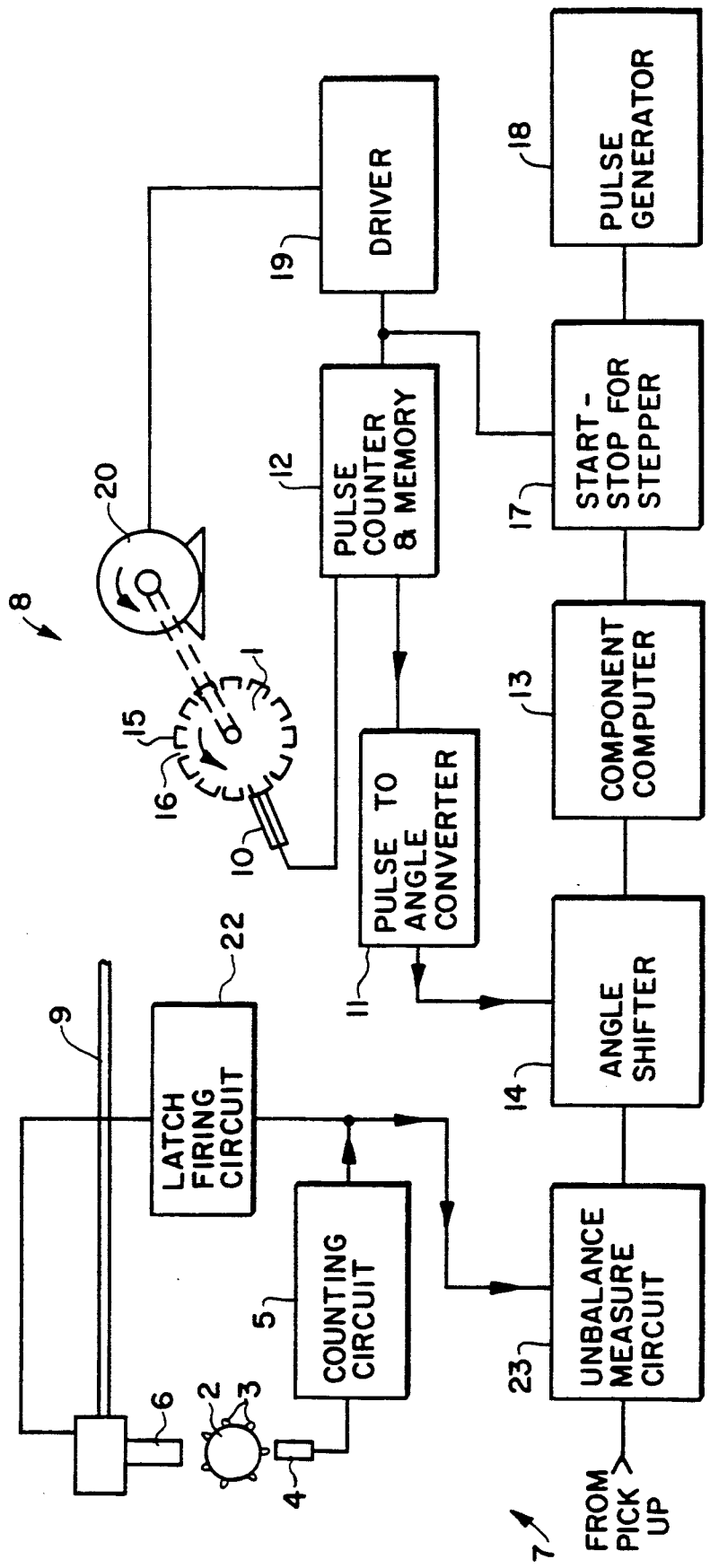
FIG. 2, a block circuit diagram for a circuit arrangement by means of which a transmission of the angle reference from the measuring station to the imbalance compensation station is attained.

In FIGS. 1 and 2, an exemplary embodiment of an apparatus for balancing a rotor is schematically shown; only those characteristics essential for explaining the invention are shown; typical characteristics conventional in such apparatus are not shown.

In this apparatus, a rotor 1 to be balanced is introduced into an imbalance measuring device 7 for measurement of the magnitude and angularity of its imbalance. The rotor 1 shown in the exemplary embodiment is embodied such that it has compensation points 15 that are suitable for imbalance compensation. These compensation points 15 are separated from one another by slits 16. However, the slits 16 are so narrow that they can no longer be conventionally detected at a rotational speed of the rotor 1 necessary for the imbalance measurement. During the imbalance measurement, the rotor, therefore, has the same properties as a smooth cylindrical body in terms of the recognition of the slits or of the compensation points 15 suitable for the imbalance compensation.

The method shown in U.S. Pat. No. 3,854,339 for obtaining an angle reference and angle information on the respective rotational angularity of the rotor can not be used here.

To eliminate such a measuring limitation, a jointly rotating component 2 is therefore connected in a manner fixed against relative rotation in the imbalance measuring station 7 with the rotor 1 that is to be balanced. In the illustrated exemplary embodiment, this jointly rotating component 2 is a gear wheel. This gear wheel has scannable structural elements 3 in the form of teeth. With the aid of a first scanner 4 these teeth are scanned during the imbalance measuring run, and the scanner 4 furnishes corresponding pulses at its output.

As FIG. 2 shows, a counter 5 is connected to the scanner 4. This counter 5 is adjustable to the particular number of structural elements 3, or teeth of the gear wheel, that can be scanned per revolution. In other words, the counter 5 is preferably reset after each revolution of the jointly rotating component 2 and begins its counting over again. In this way, each pulse counted by the counting device 5 includes angular information relating to the rotational angle of both the jointly rotating component 2 and thus the rotor 1 at that time.

The rotor 1 to be balanced may be an electric motor armature, the poles of which form the compensation points 15 that are suitable for an imbalance compensation. It may be a motor armature of a kind in which that the slits 16 between the poles are so narrow that they cannot be recognized at the rotational speed necessary for the imbalance measurement.

As already explained above, the rotational angle information required for the imbalanced measured is attained by the scanner 4 and the counter 5 connected to the scanner 4. In this process the scanner 4 scans the structural elements 3, for instance teeth of a gear wheel, and after every revolution of the jointly rotating component 2 the counting of the counter 5 begins over. Preferably, the first pulse of each counting width per revolution forms the phase reference. However, any other pulse of the counting width may also be used for this purpose.

The measured values obtained in the measuring station 7 in a measured value pickup device, not shown in detail, for the imbalance of the rotor 1 to be balanced are fed to an evaluation device 23 for the measured imbalance values. The corresponding rotational angle information is also fed into this evaluation device 23 by the counter 5. In the evaluation device 23, the measured imbalance variables are classified by angle. At its output, the evaluation device 23 therefore furnishes an imbalance vector, providing the imbalance in terms of its magnitude and angularity.

In the exemplary embodiment shown, a latch device 6 is also provided. By means of this latch device 6, after the end of the imbalance measuring run, the rotor 1 to be balanced is arrested in a particular angular position. To arrest the rotor 1 in the particular angular position, the latch device 6 can engage the jointly rotating component 2 which is connected in a manner fixed against relative rotation to the rotor 1, especially if this component is a gear wheel. The latch device 6 can then engage the scannable structural element 3 of the jointly rotating component 2 that forms the phase reference for the imbalance angle measurement. Preferably this is the structural element 3 at which the counting of the counter 5 begins again upon each revolution of the jointly rotating component 2. The jointly rotating component 2 and hence the rotor 1 may, however, instead be arrested in any other arbitrary angular position that is suitable for the transfer of the rotor 1 at the measuring station 7 to the imbalance compensation station 8 via a transfer device 9.

The scannable structural elements 3 of the jointly rotating component 2 need not necessarily be oriented in accordance with the compensation points 15 of the rotor 1 to be balanced. Both the number of compensation points 15 and the number of scannable structural elements 3 is arbitrary. In terms of the connection in a manner fixed against relative rotation of the jointly rotating component 2 and the rotor 1 to be balanced, it is unnecessary for the scannable structural elements 3 to be located at a particular angle with respect to the compensation points 15 of the rotor 1. All that is necessary in the invention is that the counter 5 be adjusted to the structural elements 3 scanned per revolution of the jointly rotating component 2, in order to obtain the required rotational angle information about the rotor 1.

In the exemplary embodiment shown, the actuation of the latch device 6 is effected via a latch control device 22. The latch control device 22 is preferably triggered by the counter 5 in the angular position already addressed, when the structural element 3 that forms the phase reference is located opposite the latch device 6.

The imbalance angle referring to the phase reference is stored in an imbalance angle memory 14 that is connected to the evaluation device 23. Upon transfer from the measuring station 7 to the imbalance compensation station 8 of the rotor 1 to be balanced, the rotor 1 is arrested in the locked angular position by the latch device 6. If this is a rotor of a type that permits an imbalance compensation at any arbitrary point, then the triggering of a driver stage 19 for an indexing motor 20 takes place, as a function of the memorized imbalance angle, preferably via a computer 13 that is capable of breaking down the memorized imbalance into components. The rotor 1 is released from its locked position, and via an indexing mechanism 21 the indexing motor 20 rotates the rotor 1 into the compensation angle position required for the imbalance compensation. To control the indexing of the indexing motor 20, the triggering of the driver stage 19 can be done via a stepping control device connected to a pulse generator 18.

If the rotor 1 to be balanced is an electric motor armature or a rotor in which an imbalance compensation can be performed only at certain compensation points on the rotor, the rotor 1 in the imbalance compensation station 8 is rotated from the locked angular position, after the release of the latch device 6, far enough that a second scanner 10 detects a slit 16 between compensation points 15, or detects one edge of a compensation point 15. This rotation is effected by the indexing motor 20, which is preferably embodied as a stepping motor. To this end, the motor furnishes a pulse counter 12, via the driver stage 19, with a suitable number of pulses corresponding to the differential angle between the locked angular position and the angular position at which a slit was discovered. This number of pulses, indicating the differential angle, is carried via a pulse/angle converter 11 to the imbalance angle memory 14, and the differential angle is added to the memorized imbalance angle. To this end, the imbalance angle memory 14 can be embodied as a shift register. However, an additional adding device may also be provided, in which the memorized imbalance angle and the angle of rotation are added together.

In the computer apparatus 13 connected to the imbalance angle memory 14, a conversion then takes place as needed of the ascertained imbalance vector into compensation components converted to the compensation points 15, in particular the poles of the electric motor armature. The computer apparatus 13 is connected to the stepping control device 17, which receives stepping pulses from the pulse generator 18. The control device 17 triggers a driver stage 19, which serves to actuate the indexing motor 20. In this way, the rotor 1 is then rotated far enough that it is located in its compensation angle position. At that time a compensation point 15, at which an imbalance compensation is to be performed, is located facing an imbalance compensation tool 24. In the exemplary embodiment shown, this tool is a milling cutter.

However, boring devices, concave millers and the like can also be used for the imbalance compensation. Moreover, an additive imbalance compensation can be performed, in which compensation masses are attached at suitable angular positions of the rotor.

In order to attain shorter travel times in the imbalance measuring operation, in case the rotor 1 is not arrested after the imbalance measuring run at the structural element 3 that forms the phase reference but rather at a structural element 3, or tooth in the case of a jointly rotating gear wheel, that is next due in the rotational motion for an immediate stop, then the angle between this structural element that is engaged by the latch device 6, and the structural element that forms the phase reference is also taken into account in the indexing. This angle is then preferentially also taken into account in the memorizing of the imbalance angle in the imbalance angle memory device 14. Upon final indexing of the rotor 1 in the imbalance compensation station 8 into the compensation angle position, this angular difference can also be taken into account.

I claim:
1. A balancing arrangement comprising:
   a rotor with an axis, said rotor having imbalance compensation points distributed symmetrically about a circumference of said rotor, said rotor comprising a scannable component having a plurality of scannable structural elements disposed symmetrically in spaced apart positions about a circumference of the scannable component, said imbalance compensation points and said scannable structural elements rotating with the same angular speed with respect to said axis;
   first scanner means for scanning said scannable structural elements of the rotor and for generating pulses corresponding to the rotational angularity of the rotor;
   counter means for counting said pulses, said counting means having a maximum count corresponding to the number of said plurality of scannable structural elements, one of said scannable structural elements forming a phase reference point for imbalance angle determining and for indexing purposes;
   imbalance measuring means for outputting a signal indicative of the magnitude and angularity of an imbalance of the rotor;
   imbalance angle determining means for receiving said signal output form said imbalance measuring means, for determining the angular relationship between the phase reference point and said imbalance of the rotor;
   second scanner means for scanning said compensation points of the rotor;
   a differential angle measuring device for determining a differential angle between the phase reference point and an angularity which the rotor assumes upon scanning the compensation points in locating the point suitable for imbalance compensation;

means for adding said differential angle to the angular relationship between the phase reference point and said imbalance of the rotor for determining an imbalance compensation position;

indexing means for indexing the rotor into said imbalance position; and compensation device means for performing the imbalance compensation of the rotor.

2. An arrangement as defined by claim 1, wherein the scannable rotating component is a drive means connected in a manner fixed against relative rotation to a rotor shaft for transferring energy to or from said rotor shaft.

3. An arrangement as defined by claim 2, wherein the scannable component comprises a gear wheel.

4. An arrangement as defined by claim 1, wherein the scannable component comprises a fan wheel connected in a manner fixed against rotation to a rotor shaft.

5. An arrangement as defined by one of claim 1 or 2, wherein the first scanner means is disposed to scan said structural elements of said rotor when the rotor is mounted on a balancing mount, the indexing means being for indexing said rotor into said imbalance compensation position when said rotor is mounted on the same balancing mount.

6. An arrangement as defined by one of claims 1 or 2, wherein an imbalance compensation station comprises the indexing means and the compensation device means, and wherein an imbalance measuring station comprises the first scanner means and the imbalance measuring means, a rotor transfer means being positioned between said imbalance measuring and imbalance compensation stations for transferring said rotor from the imbalance measuring station to the imbalance compensation station.

7. An arrangement as defined by claim 6, wherein the rotor transfer device comprises a latch device which engages at least one of said scannable components to lock the rotor in a locked angle position during said transferring.

8. An arrangement as defined by claim 1, wherein the imbalance angle determining means further comprises an imbalance angle memory device means for storing the sum of said angular relationship between the phase reference point and said imbalance of the rotor, said differential angle between the locked angle position and the next detected compensation point, and the angle between the phase reference point the locked angle position.

9. An arrangement as defined by claim 8, wherein the imbalance angle determining means further comprises a computer means for controlling the indexing means.

10. An arrangement as defined by claim 7, wherein the locked angle position is the phase reference point.

11. An arrangement as defined by claim 1, wherein the imbalance angle determining means further comprises a computer means for controlling the indexing device and for calculating imbalance compensation components to index the rotor to compensation points, the computer means using said angular relation between the phase reference point and said imbalance of the rotor, said differential angle between the locked angle position and the next detected compensation point, and the angle between the phase reference point and the locked angle position.

12. A method for balancing a rotor, the rotor having compensation points distributed symmetrically about a circumference of the rotor, the compensation points being suitable for imbalance compensation, comprising the steps of:

placing a scannable component on the rotor for joint rotation with the rotor so that a plurality of scannable elements on the component are disposed symmetrically about the component's axis of rotation;

simultaneously rotating the rotor and the scannable component;

scanning the scannable elements during each revolution of the scannable component to generate a stream of pulses corresponding to the rotation of the rotor and the scannable component during each revolution, while simultaneously associating one of said pulses of each revolution with a phase reference point;

sensing an imbalance of the rotor and determining the angularity of the imbalance with respect to the rotor using said stream of pulses;

generating an imbalance vector comprising a magnitude and an angle relative to phase reference point using the determined imbalance angularity of the rotor;

scanning the compensation points to locate a compensation point suitable for imbalance compensation;

determining a differential angle between the phase reference point and an angularity which the rotor assumes upon scanning the compensation points in locating the point suitable for imbalance compensation;

as part of said balancing step, adding said differential angle to the previously determined angle relative to the phase reference point, and indexing the rotor to a compensation angle position in response thereto; and balancing the rotor by compensating for the sensed angularity imbalance.

13. A method as in claim 12, wherein the scanning step includes the steps of counting of the scannable elements by means of a counting circuit and resetting said counter upon completion of each revolution of said scannable component.

14. A method as in claim 12, wherein the placing step includes the steps of coaxially aligning the axis of the scannable component with the axis of the rotor and fixing the scannable component to the rotor to prevent relative rotation therebetween.

15. A method as in claim 12, wherein the rotor comprises an electric motor armature and the step of scanning the compensation points includes scanning slits between poles of the armature which are symmetrically distributed on the circumference of the armature.

16. A method as in claim 15, wherein the scanning of the slits is accomplished inductively.

17. A method as in claim 15, wherein the scanning of the slits is accomplished by electrical contact.

* * * * *